(12) United States Patent
Marling

(10) Patent No.: US 9,566,837 B1
(45) Date of Patent: Feb. 14, 2017

(54) HITCH ADAPTERS

(71) Applicant: Kurt D. Marling, Janesville, WI (US)

(72) Inventor: Kurt D. Marling, Janesville, WI (US)

( * ) Notice: Subject to any disclaimer, the term of this patent is extended or adjusted under 35 U.S.C. 154(b) by 0 days.

(21) Appl. No.: 14/920,941

(22) Filed: Oct. 23, 2015

Related U.S. Application Data

(60) Provisional application No. 62/140,213, filed on Mar. 30, 2015, provisional application No. 62/084,807, filed on Nov. 26, 2014.

(51) Int. Cl.
 *B60D 1/07* (2006.01)
 *B60D 1/06* (2006.01)

(52) U.S. Cl.
 CPC ......... *B60D 1/065* (2013.01); *B60D 1/07* (2013.01); *B60D 1/075* (2013.01)

(58) Field of Classification Search
 CPC ........... B60D 1/065; B60D 1/07; B60D 1/075
 USPC ......................................................... 280/511
 See application file for complete search history.

(56) References Cited

U.S. PATENT DOCUMENTS

| | | | | |
|---|---|---|---|---|
| 2,940,775 A * | 6/1960 | Farrow | ............... | B60D 1/07 280/416.1 |
| 3,159,368 A * | 12/1964 | Ahlbin | ............... | B66D 3/02 224/520 |
| 3,346,273 A * | 10/1967 | Folkerts | ............... | B60D 1/02 280/457 |
| 3,900,214 A * | 8/1975 | Brockelsby | ............... | B66D 1/28 224/520 |
| 4,451,066 A * | 5/1984 | Collins | ............... | B60D 1/02 280/416.1 |
| 4,697,818 A * | 10/1987 | Moore | ............... | B60D 1/07 280/416.1 |
| 4,799,705 A * | 1/1989 | Janes | ............... | B60D 1/363 280/477 |
| 4,802,686 A * | 2/1989 | Isreal | ............... | B60D 1/363 280/477 |
| 5,067,742 A * | 11/1991 | Relja | ............... | B60D 1/07 280/477 |
| 5,109,931 A * | 5/1992 | Goll | ............... | B60D 1/07 172/248 |
| 5,297,407 A * | 3/1994 | Tarr | ............... | B62D 53/085 280/507 |
| 5,709,274 A * | 1/1998 | Herbold | ............... | B60D 1/07 172/248 |
| 6,155,590 A * | 12/2000 | Herrera | ............... | B25B 13/48 280/504 |
| 6,217,054 B1 * | 4/2001 | Klimek | ............... | B60D 1/06 280/416.1 |

(Continued)

*Primary Examiner* — Joseph Rocca
*Assistant Examiner* — Michael Stabley
(74) *Attorney, Agent, or Firm* — Donald J. Ersler

(57) ABSTRACT

A hitch adapter preferably includes a hitch bracket and a lock pin. The hitch bracket includes a base plate and two side plates. The two side plates extend upward from opposing edges of the base plate. A hitch ball slot is formed in one end of the base plate to receive a neck area of a hitch ball. A pin hole is formed through one end of the two side plates receive the lock pin. A plurality of holes are formed through an opposing end of the hitch bracket for securement to a handle of wheeled device. The hitch adapter may be used as previously described, or used with other components, to create a tongue hitch adapter, a handle hook adapter, a raised hitch adapter or a garbage hook adapter.

18 Claims, 8 Drawing Sheets

(56) References Cited

U.S. PATENT DOCUMENTS

| | | | |
|---|---|---|---|
| 6,530,249 B1 * | 3/2003 | Burkhead | B60D 1/06 280/507 |
| 7,571,922 B2 * | 8/2009 | Pratchler | B60D 1/065 280/477 |
| 7,673,894 B2 * | 3/2010 | Bender | B60D 1/07 280/406.1 |
| 7,926,830 B2 * | 4/2011 | Hill | B60D 1/02 280/416.1 |
| 2004/0232655 A1 * | 11/2004 | Heitlinger | B60D 1/02 280/515 |

* cited by examiner

HITCH ADAPTERS

CROSS-REFERENCES TO RELATED APPLICATIONS

This is a non-provisional patent application, which claims the benefit of provisional application No. 62/084,807 filed on Nov. 26, 2014; and 62/140,213 filed on Mar. 30, 2015.

BACKGROUND OF THE INVENTION

1. Field of the Invention

The present invention relates generally to hitches and more specifically to a hitch adapter, which has one end removably attachable to a hitch ball and the other end may be secured to a handle of wheeled device.

2. Discussion of the Prior Art

There are numerous hitch adapters in the art. However, it appears none of the hitch adapters removably capture a hitch ball below a ball portion thereof.

Accordingly, there is a clearly felt need in the art for a hitch adapter, which has one end removably attachable to a hitch ball and the other end may be secured to a handle of wheeled device.

SUMMARY OF THE INVENTION

The present invention provides a hitch adapter, which has one end removably attachable to a hitch ball. The hitch adapter preferably includes a hitch bracket and a lock pin. The hitch bracket includes a base plate and two side plates. The two side plates extend upward from opposing edges of the base plate. It is preferable to form the hitch bracket from a single piece of material. A hitch ball slot is formed in one end of the base plate to receive a neck area of a hitch ball. A pin hole is formed through one end of the two side plates to receive the lock pin. The neck area of the hitch ball is retained between side edges of the hitch ball slot, an end of the hitch ball slot and the lock pin. The lock pin is preferably a loop lock pin, but other types of lock pins may also be used. A plurality of holes are formed through an opposing end of the hitch bracket, such that the hitch bracket may be secured to a handle of wheeled device with at least one fastener. A securement hole is preferably formed through the two side plates at the opposing end thereof to retain a lock pin or the like.

The hitch adapter may be used as previously described, or used with other components to create additional embodiments. A tongue hitch adapter is created with the hitch adapter, a tongue bracket and a pivot pin. The tongue bracket preferably includes a rectangular tubular member. A tongue slot is created in two opposing sides of the rectangular tube. The tongue slot extends past half a length of the rectangular tubular member. The tongue slot creates two pin plates. A hitch pin hole is formed through the two pin plates at one end thereof. A pivot pin hole is formed through an opposing end of the rectangular tubular member. An axis of the pivot pin hole is perpendicular to an axis of the hitch pin hole. The pivot pin is preferably a loop lock pin, but other types of lock pins may also be used. The tongue adapter pivots in a vertical plane relative to the hitch adapter. The tongue slot is sized to receive a hitch pin mounting plate extending from a wheeled device. A hitch pin is inserted through the hitch pin hole of the two pin plates and a hitch pin hole of the hitch pin mounting plate. The opposing end of the hitch adapter is secured to a handle of another wheeled device with at least one fastener.

A handle hook adapter is created with the hitch adapter and a hook bracket. The hook bracket preferably includes a C-shaped base plate and a pair of hook extensions. The C-shaped base plate includes base member and two legs. A first leg extends forward from the base member on a first side. A second leg extends forward from the base member on a second side and substantially parallel to the first leg. Each hook extension includes a vertical portion and a horizontal portion. The vertical portion extends upward from the distal ends of the first and second legs. The horizontal portion extends from a distal end of the vertical portion and back toward the base member. A retention pin hole is formed through horizontal portion and the leg to receive a retention pin or the like. The base member is preferably attached to a top of the opposing end of the hitch adapter with welding, but could also be attached with at least one fastener. A handle loop is retained by the pair of hook extensions and secured in the hook bracket with the at least one lock pin. Finally, the one end of the hitch adapter is secured to a hitch ball.

A raised hitch adapter is created with a modified hitch adapter and a raised hitch projection. The raised hitch projection includes a base portion, a raised portion and a pin portion. One end of the raised portion extends from an end of the base portion and the pin portion extends from an opposing end of the raised portion. An end of the base plate of the hitch adapter is extended to be substantially flush with a distal end of the pin portion. A hitch pin hole is formed through the pin portion and the base plate to receive a hitch pin. A distance between the pin portion and the base plate is sized to receive a hitch pin mounting plate. A hitch pin is then inserted through the hitch pin holes and the hitch pin mounting plate. Finally, the one end of the hitch adapter is secured to a hitch ball.

A garbage hook adapter is created with the hitch adapter and a garbage hook. The garbage hook includes a support member and at least two retention members. The support member preferably includes a top flange and a side flange. The side flange extends downward from an edge of the top flange. A pivot hole is formed through a middle of the top flange. A plurality of retention holes are formed through the side flange. Each retention member preferably includes a first retention flange and a second retention flange. The second retention flange extends outward from an edge of the first retention flange. A bottom of the second retention flange is bent upward, substantially perpendicular to itself to form a non-pivot flange. A flange retention hole is formed through the second flange, adjacent the non-pivot flange. The at least two retention members are attached to the side flange with at least two fasteners. The top flange is attached to the opposing end of the hitch adapter with at least one fastener. Finally, the one end of the hitch adapter is secured to a hitch ball.

Accordingly, it is an object of the present invention to provide a hitch adapter, which has one end removably attachable to a hitch ball and the other end may be secured to a handle of wheeled device.

It is another object of the present invention to provide a tongue hitch adapter, which includes a hitch adapter and a tongue bracket for pivotally securing two wheeled devices to each other.

It is yet another object of the present invention to provide a handle hook adapter, which includes a hitch adapter and a hook bracket for retaining a handle loop extending from a wheeled device.

It is yet another object of the present invention to provide a raised hitch adapter, which includes a modified hitch adapter and a raised hitch projection for pivotally securing two wheeled devices to each other.

Finally, it is another object of the present invention to provide a garbage hook adapter, which includes a hitch adapter and a garbage hook for pulling a garbage cart.

These and additional objects, advantages, features and benefits of the present invention will become apparent from the following specification.

DETAILED DESCRIPTION OF THE PREFERRED EMBODIMENTS

Figure 1:
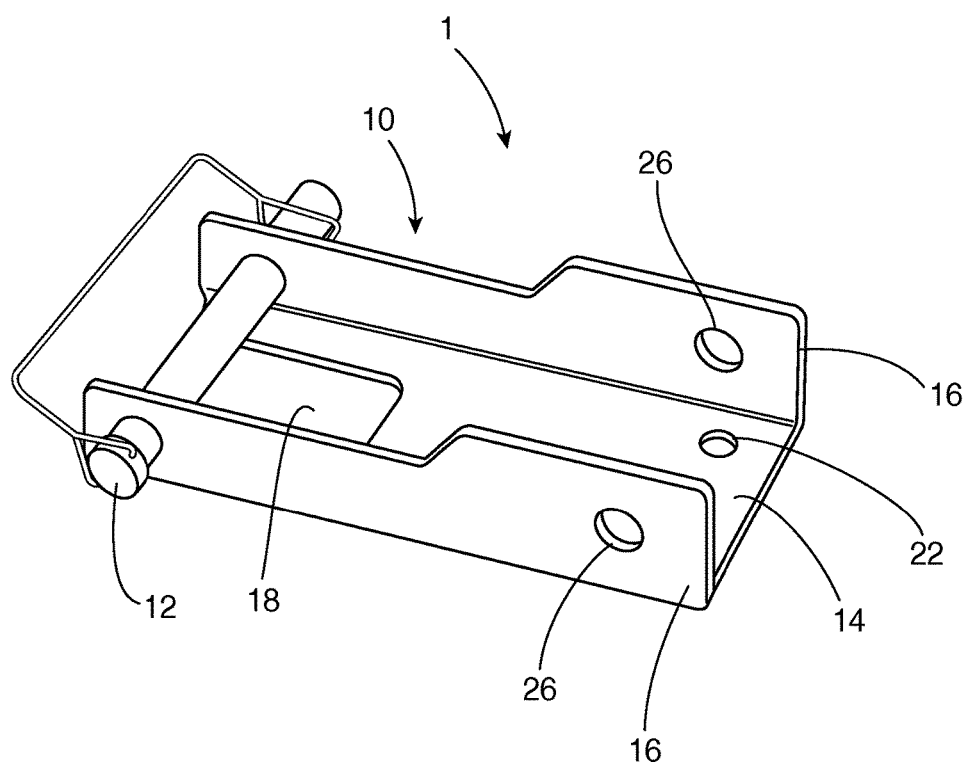
FIG. 1 is a perspective view of a hitch adapter in accordance with the present invention.
Figure 2:
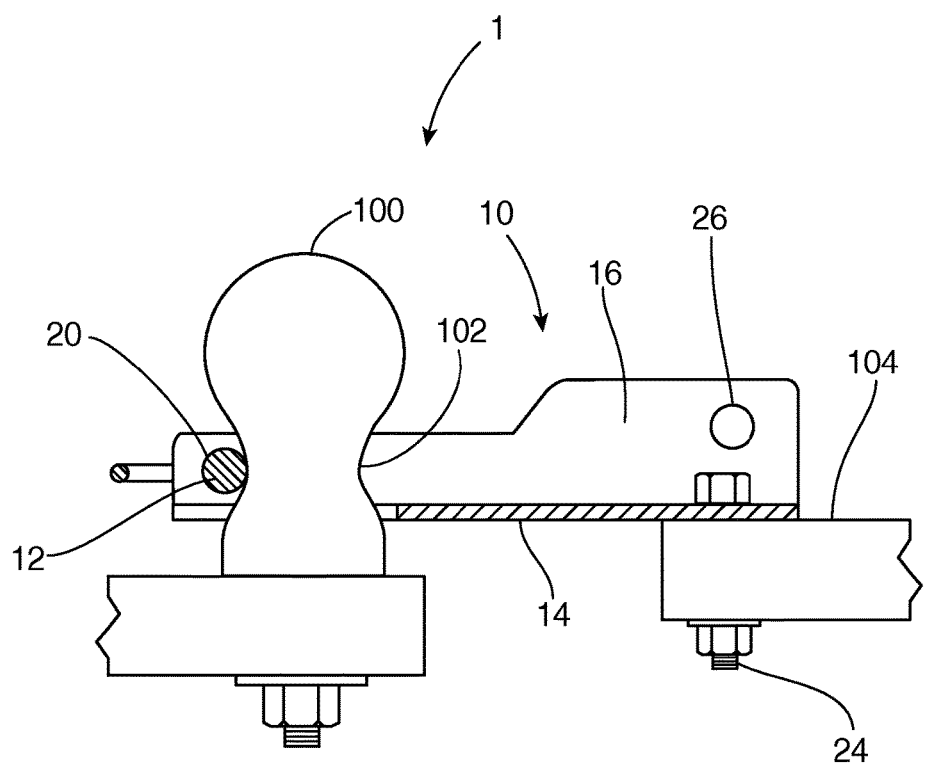
FIG. 2 is a side cross sectional view of a hitch adapter having one end secured to a hitch ball and an opposing attached to a handle of a wheeled device in accordance with the present invention.

With reference now to the drawings, and particularly to FIG. 1, there is shown a perspective view of a hitch adapter 1. The hitch adapter 1 preferably includes a hitch bracket 10 and a lock pin 12. The hitch bracket 10 includes a base plate 14 and two side plates 16. The two side plates 16 extend upward from opposing edges of the base plate 14. It is preferable to form the hitch bracket 10 from a single piece of material. With reference to FIG. 2, a hitch ball slot 18 is formed in one end of the base plate 14 to receive a neck area 102 of a hitch ball 100. A pin hole 20 is formed through one end of the two side plates 16 to receive the lock pin 12. The hitch ball 100 is retained between side edges of the hitch ball slot 18, an end of the hitch ball slot 18 and the lock pin 12. The lock pin 12 is preferably a loop lock pin, but other types of lock pins may also be used. A plurality of holes 22 are formed through an opposing end of the base plate 14, such that the hitch bracket 10 may be secured to a handle 104 of a wheeled device with at least one fastener 24. A securement hole 26 is preferably formed through the two side plates 16 at the opposing end thereof to retain a lock pin or the like.

Figure 3:
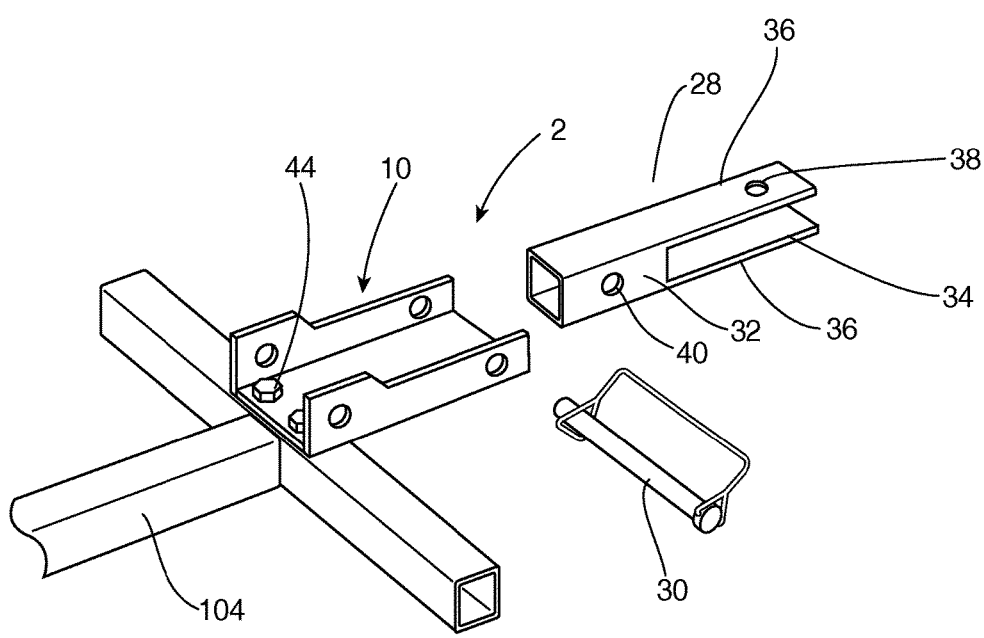
FIG. 3 is a partially exploded perspective view of a hitch tongue adapter having a hitch adapter attached to a handle with fasteners, a tongue bracket and a locking pin in accordance with the present invention.
Figure 4:
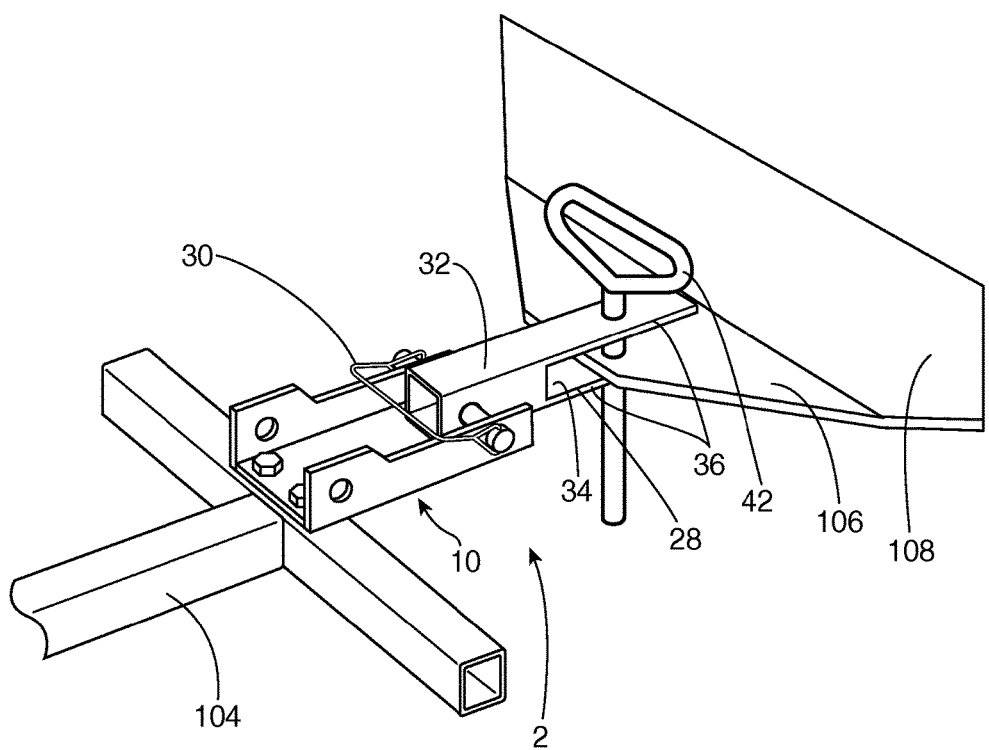
FIG. 4 is a perspective view of a hitch tongue adapter having a hitch adapter attached to a handle with fasteners and a tongue bracket attached to a hitch pin mounting plate with a hitch pin in accordance with the present invention.

The hitch bracket 10 may be used as previously described, or used with other components to create additional embodiments. With reference to FIG. 3, a tongue hitch adapter 2 is created with the hitch bracket 10, a tongue bracket 28 and a pivot pin 30. The tongue bracket 28 preferably includes a rectangular tubular member 32. A tongue slot 34 is created in two opposing sides of the rectangular tubular member 32. The tongue slot 34 extends past half a length of the rectangular tubular member 32. The tongue slot 34 creates two pin plates 36. A hitch pin hole 38 is formed through the two pin plates 36 at one end thereof. A pivot pin hole 40 is formed through an opposing end of the rectangular tubular member 32. An axis of the pivot pin hole 40 is perpendicular to an axis of the hitch pin hole 38. The pivot pin 30 is preferably a loop lock pin, but other types of lock pins may also be used. The tongue bracket 28 pivots in a vertical plane relative to the hitch bracket 10. With reference to FIG. 4, the tongue slot 34 is sized to receive a hitch pin mounting plate 106 extending from a wheeled device 108. A hitch pin 42 is inserted through the hitch pin hole 38 of the two pin plates 36 and a hitch pin hole of the hitch pin mounting plate 106. The opposing end of the hitch bracket 10 is secured to the handle 104 of another wheeled device with at least one fastener 44.

Figure 5:
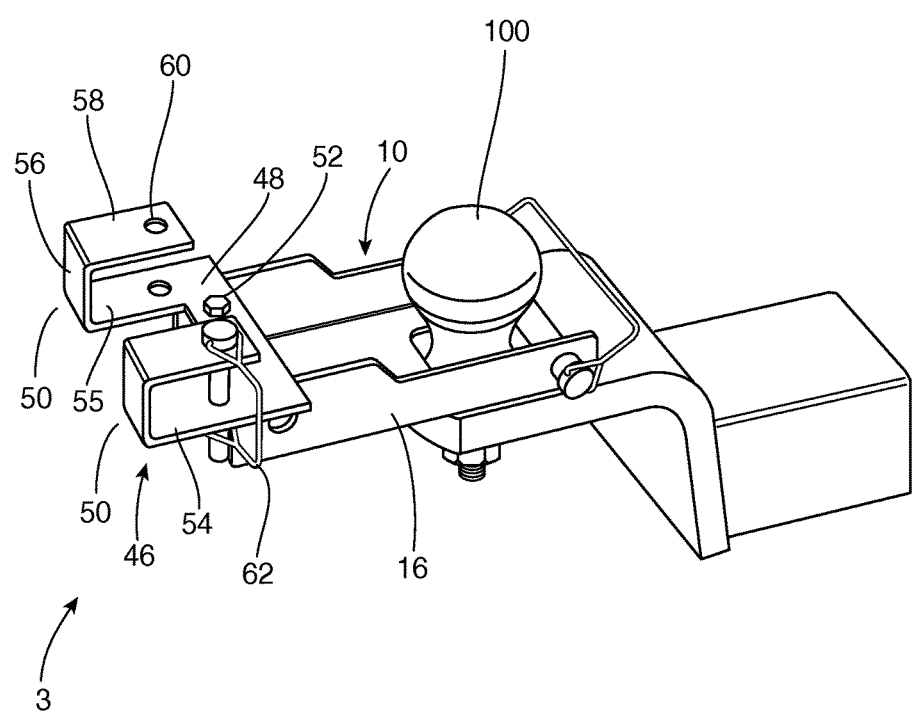
FIG. 5 is a perspective view of a handle hook adapter having one end of a hitch adapter attached to a hitch ball and a hook member attached to an opposing end of the hitch adapter in accordance with the present invention.
Figure 6:
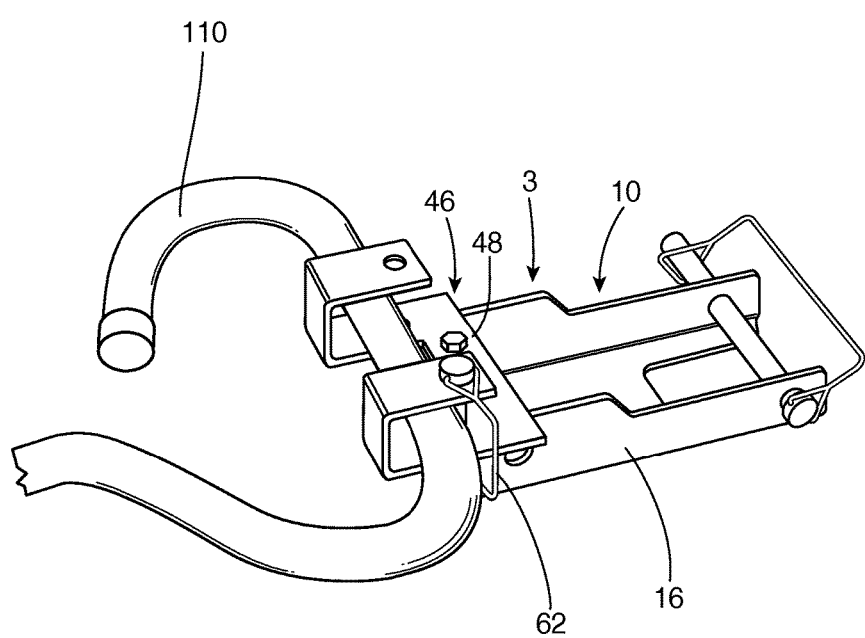
FIG. 6 is a perspective view of a handle hook adapter having a handle loop retained in a hook member with a lock pin in accordance with the present invention.

With reference to FIGS. 5-6, a handle hook adapter 3 is created with the hitch bracket 10 and a hook bracket 46. The hook bracket 46 preferably includes a C-shaped base plate 48 and a pair of hook extensions 50. The C-shaped base plate 48 includes a base member 52 and two legs 54, 55. A first leg 54 extends forward from the base member 52 on a first side. A second leg 55 extends forward from the base member 52 on a second side and substantially parallel to the first leg 54. Each hook extension 50 includes a vertical portion 56 and a horizontal portion 58. The vertical portion 58 extends upward from the distal ends of the first and second legs 54, 55. The horizontal portion 58 extends from a distal end of the vertical portion 56 and back toward the base member 52. A retention pin hole 60 is formed through the horizontal portion 58 and the leg 54, 55 to receive a retention pin 62 or the like. The base member 52 is preferably attached to a top of the two side plates 16 of the hitch bracket 10 with welding, but could also be attached with at least one fastener. A handle loop 110 is retained by the pair of hook extensions 50 and secured in the hook bracket 46 with the at least one lock pin 62. Finally, the one end of the hitch bracket 10 is secured to a hitch ball 100.

Figure 7:
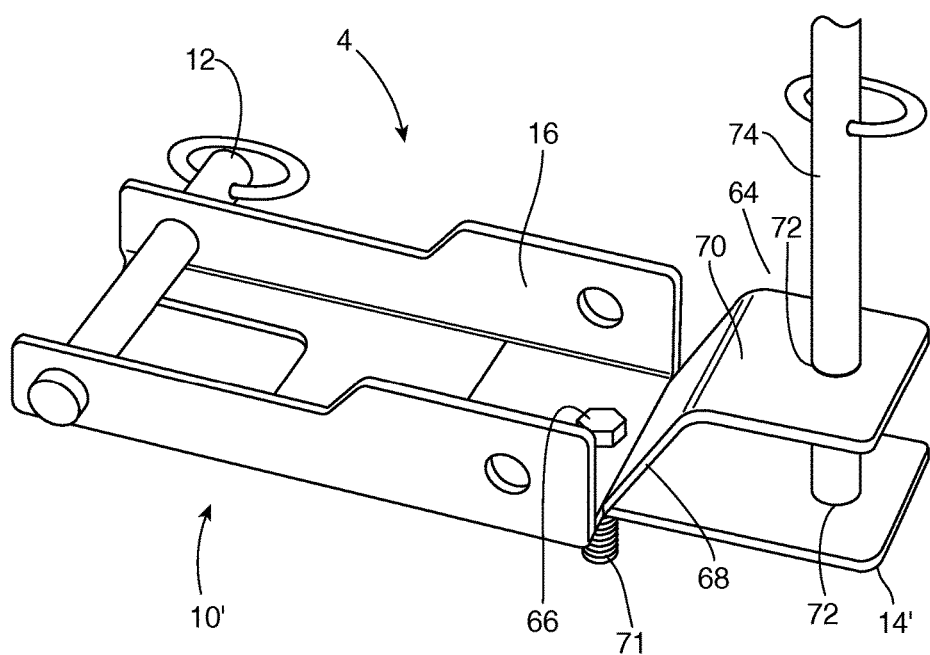
FIG. 7 is a perspective view of a raised hitch adapter in accordance with the present invention.

A raised hitch adapter 4 is created with a modified hitch bracket 10' and a raised hitch projection 64. The raised hitch projection 64 includes a base portion 66, a raised portion 68 and a pin portion 70. One end of the raised portion 68 extends from an end of the base portion 66 and the pin portion 70 extends from an opposing end of the raised portion 68. An end of a base plate 14' of the hitch bracket 10' is extended to be substantially flush with a distal end of the pin portion 70. The base portion 66 is attached to a top of the base plate 14' with welding, at least one fastener or any other suitable method. A hitch pin hole 72 is formed through the pin portion 70 and the base plate 14' to receive a hitch pin 74. With reference to FIG. 7, a distance between the pin portion 70 and the base plate 14' is sized to receive the hitch pin mounting plate 106. The hitch pin 74 is then inserted through the hitch pin holes 72 and the hitch pin mounting plate 106. Finally, the one end of the hitch bracket 10' is secured to the hitch ball 100.

Figure 8:
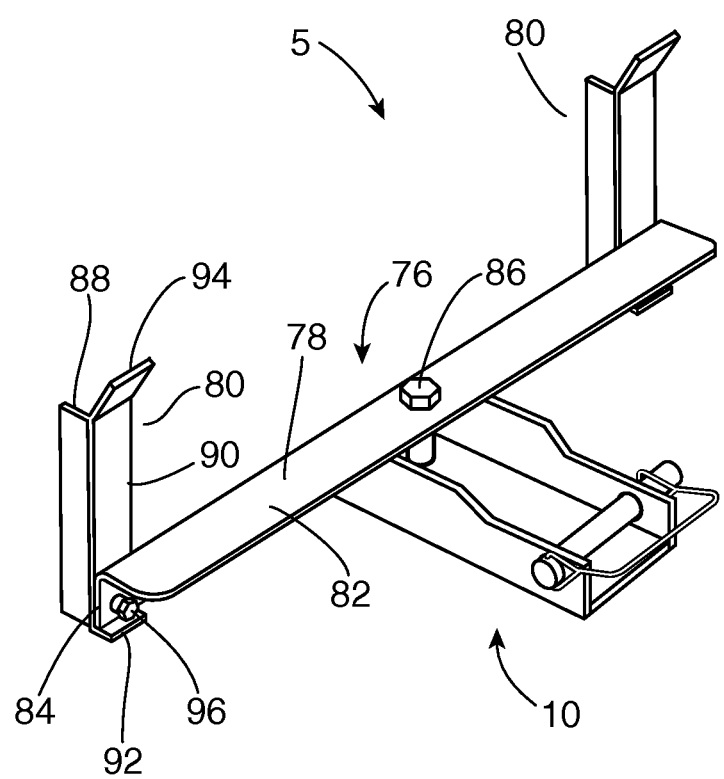
FIG. 8 is a perspective view of a garbage hook adapter in accordance with the present invention.

With reference to FIG. 8, a garbage hook adapter 5 is created with the hitch bracket 10 and a garbage hook 76. The garbage hook 76 includes a support member 78 and at least two retention members 80. The support member 78 preferably includes a top flange 82 and a side flange 84. The side flange 84 extends downward from an edge of the top flange 82. A pivot hole is formed through a middle of the top flange 82 to receive a fastener 86. A plurality of retention holes are formed through the side flange 84 for attachment of the at least two retention members 80 with a fastener 86. Each retention member 80 preferably includes a first retention flange 88 and a second retention flange 90. The second retention flange 90 extends outward from an edge of the first retention flange 88. A bottom of the second retention flange 90 is bent upward, substantially perpendicular to itself to form a non-pivot flange 92. A retention flange 94 is formed by bending a top of the second retention flange 90 to an acute angle. A flange retention hole is formed through the second flange, adjacent the non-pivot flange 92. The at least two retention members 80 are attached to the side flange 84 with at least two fasteners 96. The top flange 82 is attached to the opposing end of the hitch bracket 10 with at least one fastener 96. Finally, the one end of the hitch bracket 10 is secured to the hitch ball 100.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A hitch adapter for attachment to a hitch ball comprising:
  a lock pin; and
  a hitch bracket including a base plate, a first side plate and a second side plate, said first side plate extends upward from a first edge of said base plate, said second side plate extends upward from a second edge of said base plate, a hitch ball slot is formed in one end of said base plate, said hitch ball slot includes a width which is sized to receive a neck area of a hitch ball, said hitch ball slot includes an open end, a pin hole is formed through said one end of said first and second side plates to receive said lock pin, wherein a neck area of the hitch ball is slid into said open end of said hitch ball slot and past said pin hole, said lock pin is inserted through said pin hole in said first and second side plates, the neck area of the hitch ball is retained in said hitch ball slot with said lock pin.

2. The hitch adapter for attachment to a hitch ball of claim 1 wherein:
  said hitch bracket is fabricated from a single piece of material.

3. The hitch adapter for attachment to a hitch ball of claim 1, further comprising:
  a tongue bracket includes a rectangular tubular member, a tongue slot is formed through one end of said rectangular tubular member, said tongue slot creates two pin plates, an opposing end of said tongue bracket is pivotally retained by said one end of said hitch bracket.

4. The hitch adapter for attachment to a hitch ball of claim 1, further comprising:
  a hook bracket includes a C-shaped base plate and two hook extensions, said C-shaped base plate includes a base member, a first leg and a second leg, said first leg extends forward from said base member on a first side, said second leg extends forward from said base member on a second side, each one of said two hook extensions includes a vertical portion and a horizontal portion, said vertical portion extends upward from a distal of said leg, said horizontal portion extends from a distal end of said vertical portion, said base plate is attached to an opposing end of said hitch adapter.

5. The hitch adapter for attachment to a hitch ball of claim 1, further comprising:
  a raised hitch projection includes a base portion, a raised portion and a pin portion, one end of said raised portion extends from an end of said base portion and said pin portion extends from an opposing end of said raised portion, said base portion is attached to said opposing end of said base plate, said base plate is extended to be substantially flush with a distal end of said pin portion, a hitch pin hole is formed through said pin portion and said pin portion to a hitch pin.

6. The hitch adapter for attachment to a hitch ball of claim 1, further comprising:
  a garbage hook includes a support member and at least two retention members, said support member includes a top flange and a side flange, said side flange extends downward from an edge of said top flange, said at least two retention members are attached to said side flange, said top flange is attached to said opposing end of said hitch adapter.

7. A hitch adapter for attachment to a hitch ball comprising:
  a lock pin; and
  a hitch bracket including a base plate, a first side plate and a second side plate, said first side plate extends upward from a first edge of said base plate, said second side plate extends upward from a second edge of said base plate, a hitch ball slot is formed in one end of said base plate, said hitch ball slot includes a width which is sized to receive a neck area of a hitch ball, said hitch ball slot includes an open end, said hitch ball slot having a U-shape, a pin hole is formed through said one end of said first and second side plates to receive said lock pin, wherein a neck area of the hitch ball is slid into said open end of said hitch ball slot substantially parallel to said base plate and past said pin hole, said lock pin is inserted through said pin hole in said first and second side plates, the neck area of the hitch ball is retained in said hitch ball slot with said lock pin.

8. The hitch adapter for attachment to a hitch ball of claim 7 wherein:
  said hitch bracket is fabricated from a single piece of material.

9. The hitch adapter for attachment to a hitch ball of claim 7, further comprising:
  a tongue bracket includes a rectangular tubular member, a tongue slot is formed through one end of said rectangular tubular member, said tongue slot creates two pin plates, an opposing end of said tongue bracket is pivotally retained by said one end of said hitch bracket.

10. The hitch adapter for attachment to a hitch ball of claim 7, further comprising:
  a hook bracket includes a C-shaped base plate and two hook extensions, said C-shaped base plate includes a base member, a first leg and a second leg, said first leg extends forward from said base member on a first side, said second leg extends forward from said base member on a second side, each one of said two hook extensions includes a vertical portion and a horizontal portion, said vertical portion extends upward from a distal of said leg, said horizontal portion extends from a distal end of said vertical portion, said base plate is attached to an opposing end of said hitch adapter.

11. The hitch adapter for attachment to a hitch ball of claim 7, further comprising:
  a raised hitch projection includes a base portion, a raised portion and a pin portion, one end of said raised portion extends from an end of said base portion and said pin portion extends from an opposing end of said raised portion, said base portion is attached to said opposing end of said base plate, said base plate is extended to be substantially flush with a distal end of said pin portion, a hitch pin hole is formed through said pin portion and said pin portion to a hitch pin.

12. The hitch adapter for attachment to a hitch ball of claim 7, further comprising:
a garbage hook includes a support member and at least two retention members, said support member includes a top flange and a side flange, said side flange extends downward from an edge of said top flange, said at least two retention members are attached to said side flange, said top flange is attached to said opposing end of said hitch adapter.

13. A hitch adapter for attachment to a hitch ball comprising:
a lock pin; and
a hitch bracket including a base plate, a first side plate and a second side plate, said first side plate extends upward from a first edge of said base plate, said second side plate extends upward from a second edge of said base plate, a hitch ball slot is formed in one end of said base plate, said hitch ball slot includes a width which is sized to receive a neck area of a hitch ball, said hitch ball slot includes an open end, said hitch ball slot having a U-shape, a pin hole is formed through said one end of said first and second side plates to receive said lock pin, wherein a neck area of the hitch ball is slid into said open end of said hitch ball slot and past said pin hole, said lock pin is inserted through said pin hole in said first and second side plates, the neck area of the hitch ball is retained in said hitch ball slot with said lock pin.

14. The hitch adapter for attachment to a hitch ball of claim 13 wherein:
said hitch bracket is fabricated from a single piece of material.

15. The hitch adapter for attachment to a hitch ball of claim 13, further comprising:
a tongue bracket includes a rectangular tubular member, a tongue slot is formed through one end of said rectangular tubular member, said tongue slot creates two pin plates, an opposing end of said tongue bracket is pivotally retained by said one end of said hitch bracket.

16. The hitch adapter for attachment to a hitch ball of claim 14, further comprising:
a hook bracket includes a C-shaped base plate and two hook extensions, said C-shaped base plate includes a base member, a first leg and a second leg, said first leg extends forward from said base member on a first side, said second leg extends forward from said base member on a second side, each one of said two hook extensions includes a vertical portion and a horizontal portion, said vertical portion extends upward from a distal of said leg, said horizontal portion extends from a distal end of said vertical portion, said base plate is attached to an opposing end of said hitch adapter.

17. The hitch adapter for attachment to a hitch ball of claim 13, further comprising:
a raised hitch projection includes a base portion, a raised portion and a pin portion, one end of said raised portion extends from an end of said base portion and said pin portion extends from an opposing end of said raised portion, said base portion is attached to said opposing end of said base plate, said base plate is extended to be substantially flush with a distal end of said pin portion, a hitch pin hole is formed through said pin portion and said pin portion to a hitch pin.

18. The hitch adapter for attachment to a hitch ball of claim 13, further comprising:
a garbage hook includes a support member and at least two retention members, said support member includes a top flange and a side flange, said side flange extends downward from an edge of said top flange, said at least two retention members are attached to said side flange, said top flange is attached to said opposing end of said hitch adapter.

* * * * *